(12) United States Patent
Blech et al.

(10) Patent No.: US 6,591,311 B1
(45) Date of Patent: Jul. 8, 2003

(54) METHOD AND SYSTEM FOR SELECTING CONTROLLER OUTPUT VALUE SOURCE

(75) Inventors: Steven P. Blech, Twinsburg, OH (US); Gregory A. Majcher, Broadview Heights, OH (US); John P. Caspers, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/559,625

(22) Filed: Apr. 27, 2000

(51) Int. Cl.$^7$ .................. G06F 13/00; G06F 13/10
(52) U.S. Cl. .............. 710/7; 710/11; 709/223; 709/224; 709/225
(58) Field of Search ............ 710/7, 11; 709/223, 709/224, 225

(56) References Cited

U.S. PATENT DOCUMENTS

| | | | |
|---|---|---|---|
| 4,361,876 A | 11/1982 | Groves | |
| 4,609,922 A | 9/1986 | Boegli et al. | 340/825.58 |
| 4,691,317 A | 9/1987 | Miazga et al. | |
| 4,829,445 A | 5/1989 | Burney | 700/230 |
| 5,201,397 A | 4/1993 | Isaccs | 198/395 |
| 5,247,668 A * | 9/1993 | Smith et al. | 345/970 |
| 5,285,887 A | 2/1994 | Hall | 198/460.1 |
| 5,382,971 A * | 1/1995 | Chanteau | 725/144 |
| 5,453,674 A | 9/1995 | Seki et al. | 318/573 |
| 5,519,726 A | 5/1996 | DiCarlo | 375/224 |
| 5,582,286 A | 12/1996 | Kalm et al. | 172/395 |
| 5,608,618 A | 3/1997 | Kosaka et al. | 700/61 |
| 5,793,982 A * | 8/1998 | Shrader et al. | 709/100 |
| 5,809,220 A | 9/1998 | Morrison et al. | 714/12 |
| 5,862,391 A | 1/1999 | Salas et al. | 713/300 |
| 5,862,907 A | 1/1999 | Taylor | 198/781.05 |
| 5,872,904 A | 2/1999 | McMillen et al. | 714/4 |
| 5,872,911 A | 2/1999 | Berg | 714/43 |
| 5,887,029 A | 3/1999 | Husted et al. | 375/224 |

(List continued on next page.)

FOREIGN PATENT DOCUMENTS

| | | |
|---|---|---|
| DE | 678715 | 12/1978 |
| DE | 4115327 | 11/1992 |
| DE | 19546842 | 6/1997 |
| EP | 0953524 | 3/1994 |

OTHER PUBLICATIONS

Pub. Interroll Meca Interroll Corp. Wilmington, NC Jun. 10, 1992.

*Primary Examiner*—Jeffrey Gaffin
*Assistant Examiner*—Rehana Perveen
(74) *Attorney, Agent, or Firm*—Amin & Turocy; Alexander M. Gerasimow; William R. Walbrun (57) ABSTRACT

A method and system for selecting an output value source for an industrial control device are disclosed. The invention avoids the problems associated with conventional output devices by allowing a user to define one or more attributes associated with the output device, as well as defining a binding to local logic. The user may thereby determine or select the output value source which will be used by the output device under a variety of system conditions, depending on configuration of the output device or module, the current state of the module, and the state of a network. The method provides associating the output device with a logic function, providing the output value according to the logic function, ignoring explicit messages from the network, ignoring value messages from the network, selectively ignoring fault messages according to an override attribute, and selectively ignoring idle messages according to the override attribute. In addition, a system is provided for implementing the output value source selection for an output device, and an output module is provided which allow a user to define the source of the output value.

18 Claims, 4 Drawing Sheets

U.S. PATENT DOCUMENTS

| | | | |
|---|---|---|---|
| 5,906,268 A | 5/1999 | Kalm | 198/781.06 |
| 5,980,082 A | 11/1999 | Watanabe et al. | 700/86 |
| 6,021,888 A | 2/2000 | Itoh et al. | 198/783 |
| RE36,632 E | 3/2000 | Iwande | 358/498 |
| 6,035,999 A | 3/2000 | Hall | 198/781.06 |
| 6,081,518 A | 6/2000 | Bowman-Amuah | 370/352 |
| 6,088,628 A | 7/2000 | Watanabe et al. | 700/264 |
| 6,163,129 A | 12/2000 | Younger et al. | 318/799 |
| 6,193,054 B1 | 2/2001 | Henson et al. | 198/783 |
| 6,244,421 B1 | 6/2001 | Hall | 198/460.1 |
| 6,253,906 B1 | 7/2001 | Hall | 198/460.1 |
| 6,253,909 B1 | 7/2001 | Kalm et al. | 198/781.06 |
| 6,324,443 B1 | 11/2001 | Kurakake et al. | 700/245 |

\* cited by examiner

METHOD AND SYSTEM FOR SELECTING CONTROLLER OUTPUT VALUE SOURCE

TECHNICAL FIELD

The present invention relates to the art of industrial controllers, and more particularly to a method and system for selecting controller output value source.

BACKGROUND OF THE INVENTION

Industrial controllers are special purpose computers used for controlling industrial processes, manufacturing equipment, and other factory automation. In accordance with a control program, the industrial controller measures one or more process variables or inputs reflecting the status of a controlled process, and changes outputs effecting control of the process. The inputs and outputs may be binary, (e.g., on or off), as well as analog inputs and outputs assuming a continuous range of values. The control program may be executed in a series of execution cycles with batch processing capabilities.

The measured inputs received from a controlled process and the outputs transmitted to the process generally pass through one or more input/output (I/O) modules. These I/O modules serve as an electrical interface between the controller and the controlled process, and may be located proximate or remote from the controller. The inputs and outputs are recorded in an I/O table in processor memory. Input values may be asynchronously read from the controlled process by one or more input modules and output values are written directly to the I/O table by the processor for subsequent communication to the process by specialized communications circuitry. An output module may interface directly with a controlled process, by providing an output from an table to an actuator such as a valve, solenoid, and the like.

During execution of the control program, values of the inputs and outputs exchanged with the controlled process pass through the I/O table. The values of inputs in the I/O table are asynchronously updated from the controlled process by dedicated scanning circuitry. This scanning circuitry may communicate with input modules over a bus on a backplane or network communications. The scanning circuitry also asynchronously writes values of the outputs in the I/O table to the controlled process. The output values from the I/O table are then communicated to one or more output modules for interfacing the process. Thus, the processor may simply access the I/O table rather than needing to communicate directly with the controlled process.

An industrial controller may be customized to the particular process by writing control software that may be stored in the controller's memory and/or by changing the hardware configuration of the controller to match the control task. Controller hardware configuration is facilitated by separating the industrial controller into a number of control modules, each of which is performing a different function. Particular control modules needed for the control task may then be connected together on a common backplane within a rack. The control modules may include processors, power supplies, network communication modules, and I/O modules exchanging input and output signals directly with the controlled process. Data may be exchanged between modules using a backplane communications bus, which may be serial or parallel. A typical hardware modification may involve adding additional I/O modules so as to be able to control additional equipment.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

In a typical distributed control system, one or more output modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an explicit message or an I/O message. The output module receiving such a message will provide a corresponding output (analog or digital) to the controlled process.

Many current output modules or devices provide outputs solely based on such messages, having no internal logic. For example, the module provides an output according to an output value received in an I/O message from a master (e.g., a PLC), and will maintain that value during normal operation until another message is received. In some modules, certain conditions can affect the output value. For instance, when a module detects a communications fault, the output may go to a known state. However, there are many sources that can affect an output point's value. These include an I/O message, an explicit message, local logic, fault or idle values, and/or a forcing message. Heretofore, the source of an output value was determined according to fixed controller architecture constraints. Thus, a user had limited ability to decide priorities for the source of an output module's output value.

SUMMARY OF THE INVENTION

In accordance with the present invention, there is provided a method for selecting an output value for an output device or module in a controller or control system, which allows a user to define which value source will provide the output value. The user may define one or more attributes associated with an output, which are used by the module to select its value source. More than one source may provide an output value, one of which may be selected by a module based on configuration of the module, the current state of the module, and the state of the network.

According to one aspect of the present invention, the method comprises associating an output device with a logic function, and providing the output value according to the logic function. The logic function may be local logic, provided by a PLC or other processor communicating with the output device, or may be integral with the output device. The method further comprises ignoring explicit messages from the network, ignoring I/O value messages from the network, selectively ignoring fault messages according to an override attribute, and selectively ignoring idle messages according to an override attribute. In this regard, a control system user may configure an output module by defining various attributes (e.g., override attributes) to thereby define the output value source selection semantics. The source of an output device's output value is then determined based on the user-defined attributes as well as system conditions (e.g., the current state of the module, and the state of the network).

By providing a user with the ability to define and control the output value source selection, the invention allows a user to ensure safe operation of a process under a variety of circumstances.

Another aspect of the present invention provides for creating a binding between the output device and local logic. The local logic may be a function block, a hardware input, a fault, and/or an output. An output can thus be bound to any system value that a developer thinks may be useful in local logic.

According to another aspect of the present invention, the method may further comprise selectively using an idle action and setting the output value according to an idle value when the local logic function is disabled. In addition, where a fault is detected, the method may provide for selectively using a fault action and setting the output value according to a fault value. In this regard, the user may define one or more override attributes in configuring the output device, which are then used to determine whether the fault action and fault value are to be used when a fault event occurs.

According to another aspect of the invention, the method may provide for sending an object state conflict error to the network in response to an explicit message from the network. In this way, the binding of an output to local logic will take precedence over explicit messages received from a network, and the output module may inform the source of an explicit message that there is an object state conflict because it is bound to the local logic.

According to still another aspect of the invention, idle messages may be selectively ignored, depending on a user-defined override attribute. Thus, a user may define whether idle messages received from a network will be ignored or whether the output will use an idle action and set the output value according to an idle value.

In accordance with another aspect of the invention, a system is provided for selecting an output value for an output device in communication with a network. The system comprises means for associating the output device with a logic function, means for providing the output value according to the logic function, means for ignoring explicit messages from the network, means for ignoring value messages from the network, means for selectively ignoring fault messages according to an override attribute, and means for selectively ignoring idle messages according to the override attribute. The system provides for user-defined control over the state of an output according to the configuration of an output device or module, the current state of the device, as well as the state of the network.

According to another aspect of the invention, there is provided an output module, comprising a value source selector adapted to receive messages from a network, a local logic function associated with the value source selector to create a binding, which provides a signal to the value source selector, and an output receiving an output value from the value source selector based on the signal from the local logic function, and generating an output signal. The output signal may be applied to a controlled process, machine, etc. The value source selector is adapted to selectively ignore I/O and explicit messages from the network based on the binding and to selectively use an idle action and set the output value according to an idle value when the local logic function is disabled. In addition, the value source selector may selectively use a fault action and set the output value according to a fault value based on an override attribute. The value source selector may further selectively ignore idle messages according to the override attribute.

To the accomplishment of the foregoing and related ends, the invention, then, comprises the features hereinafter fully described. The following description and the annexed drawings set forth in detail certain illustrative embodiments of the invention. However, these embodiments are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The various aspects of the present invention will now be described with reference to the drawings, wherein like reference numerals are used to refer to like elements throughout. The invention provides a system and methodology for selecting an output value for an output device or module. The invention avoids the problems associated with conventional output devices by allowing a user to define one or more attributes associated with the output device, as well as defining a binding to local logic. The user may thereby determine or select the output value source which will be used by the output device under a variety of system conditions, depending on configuration of the output device or module, the current state of the module, and the state of a network.

Figure 1:
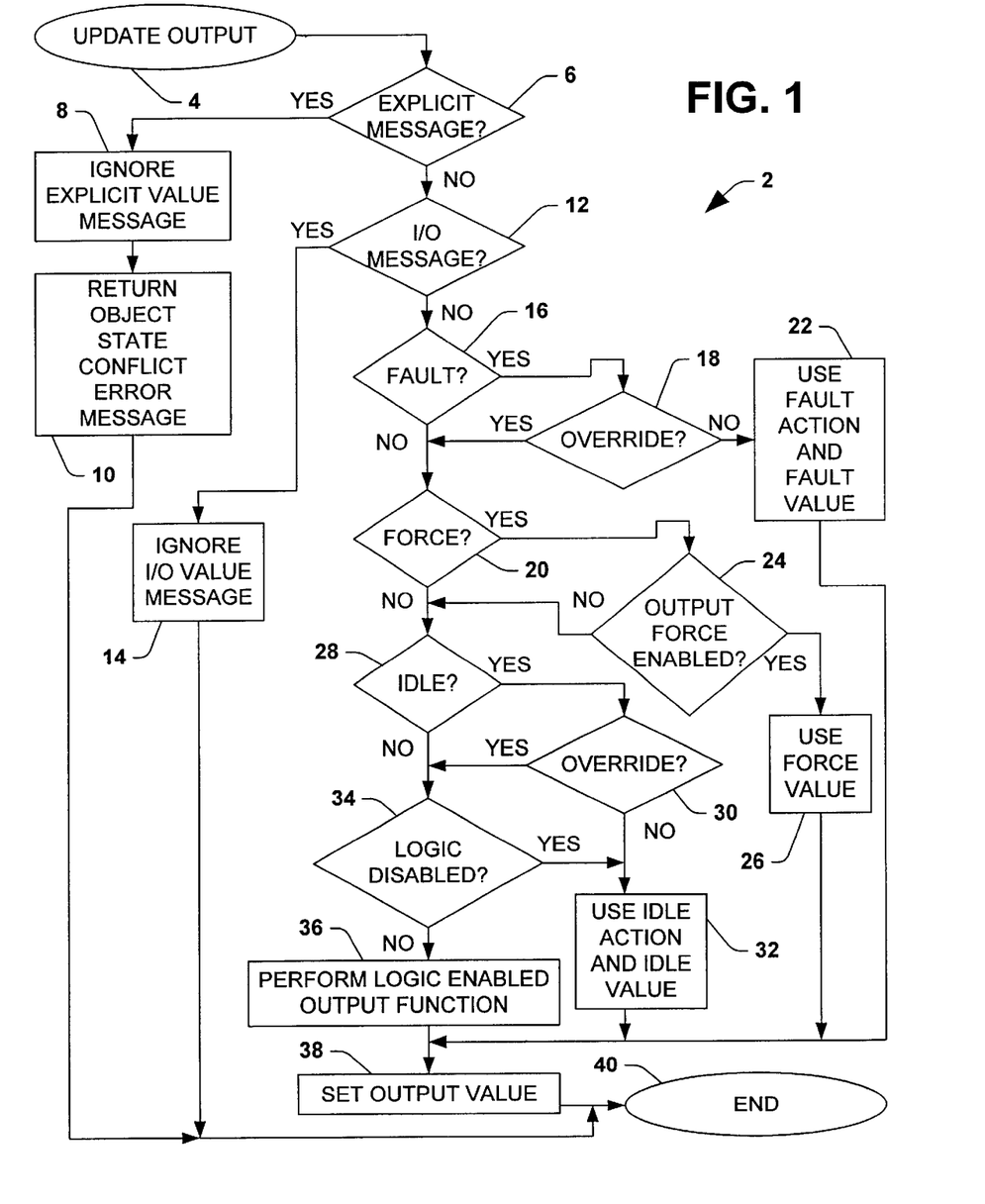
FIG. 1 is a flow diagram schematically illustrating a method for selecting an output value for an output device or module.

Referring now to the drawings, FIG. 1 illustrates a method 2 of selecting an output value for an output device or module (not shown) according to the invention. As discussed in greater detail infra, a user may define an association (e.g., a binding) between the output device and a logic function (not shown), which may comprise, for example, local logic. With such an association defined, the output value update begins at step 4, after which the presence of an explicit message is determined at step 6. Explicit messages may be a request to change the output value of the module or device, for example, a configuration request message.

If an explicit message has been received, the message will be ignored at step 8 (e.g., the value in the explicit message will not be used to set the device output value), and an object state conflict error message will be returned at step 10 in response to the explicit message. Since the receipt of explicit messages as well as I/O messages discussed infra, are generally asynchronous to the updating of the output value, the steps 6, 8, and 10, and the processing of I/O messages at steps 12 and 14, are done without performing the set output value step 38. Thus, when an output has been associated with (e.g., bound to) a logic function, it no longer allows explicit messaging services to change its value. Instead, it will return an error indicating an "Object State Conflict".

Decision step 12 determines whether any I/O messages have been received. If so, these are ignored at step 14, since the output device is associated with a logic function. As an example, an I/O message may be sent by a PLC or other device which is running a ladder logic program, in order to update an output device according to the ladder logic. When an output device is bound, it no longer uses the consumed data from an I/O connection (e.g., with a PLC) to update its value. Instead, the source of information that it is bound to will be used.

During a normal update of the device output value, the presence of faults is determined at step 16. When an output is bound and a "Receive Fault" event occurs or a consuming I/O connection times out, the output device may override fault action and fault value settings, based on an override attribute (not shown) at step 18. If the override attribute is set, the method proceeds to step 20. If not, the output value is set according to a fault value at step 22. In this case, the device may also perform a fault action, which may comprise going to a known output value (e.g., the fault value), or holding the last value, etc. The override attribute, fault action, and fault value may be defined by a user via a network tool, as described in greater detail infra.

If no faults are present, or if the override attribute is set, step 20 determines whether a force message has been received. A force message may be generated by a master on a network, which tells an output module to force an output to a specified state, regardless of the I/O state derived from a PLC logic program or from associated local logic. In some conventional systems, this is accomplished by a PLC receiving a force message from the network, and ignoring it's own internal logic, instead sending I/O messages to an output module based on the state specified in the force message. Thus, the output will be set to the state specified in the force message until the module (or PLC) receives another message from the master.

If such a force message has been received, step 24 determines whether the output force feature has been enabled. This feature may be implemented via a force enable attribute (not shown). If the force feature is enabled, the device output value will be set according to a force value at step 26. If no output force message is received, or if the force attribute is not enabled, the method proceeds to step 28, where the presence of an idle message is determined.

When an output is bound and a "Receive Idle" event occurs, the output may override idle action and idle value settings based on the setting of an override attribute (not shown) at step 30, which may be the same override attribute discussed supra with respect to fault override. An example of a receive idle event is where a user switches a PLC or other processor from run mode into a program mode. Where the output is associated with a logic function (e.g., being controlled locally), it is assumed that the I/O connection is not needed for controlling the output's value, and hence the invention provides for selectively ignoring a receive idle event based on the override attribute. If an output is dependent on consumed data, the user can configure the override attribute accordingly. If the override attribute is not set, an idle action and idle value are used at step 32. The idle action may be, for example, to hold the last valid output value, or to go to a known output value, such as the idle value. Otherwise, the method proceeds to decision step 34.

Step 34 determines whether the logic function (e.g., local logic) with which the output device has been associated has been disabled. If so, the idle action and idle value are used at step 32. When an output is bound, it will enter an idle state when local logic is disabled, during which time idle action and idle values will be applied. If the local logic is not disabled, the logic enabled output function is performed at step 36, and the output value is set at step 38 according to the local logic function, after which the value source selection method 2 is completed at step 40. The method illustrated in FIG. 1 thus allows a user many options in selecting an output value source for the output device or module. This provides significant advantages over conventional networked I/O where the output value is controlled by information received from an I/O or explicit messaging service, or in the case of a fault or idle condition, from fault state and idle state attributes, respectively.

Figure 2:
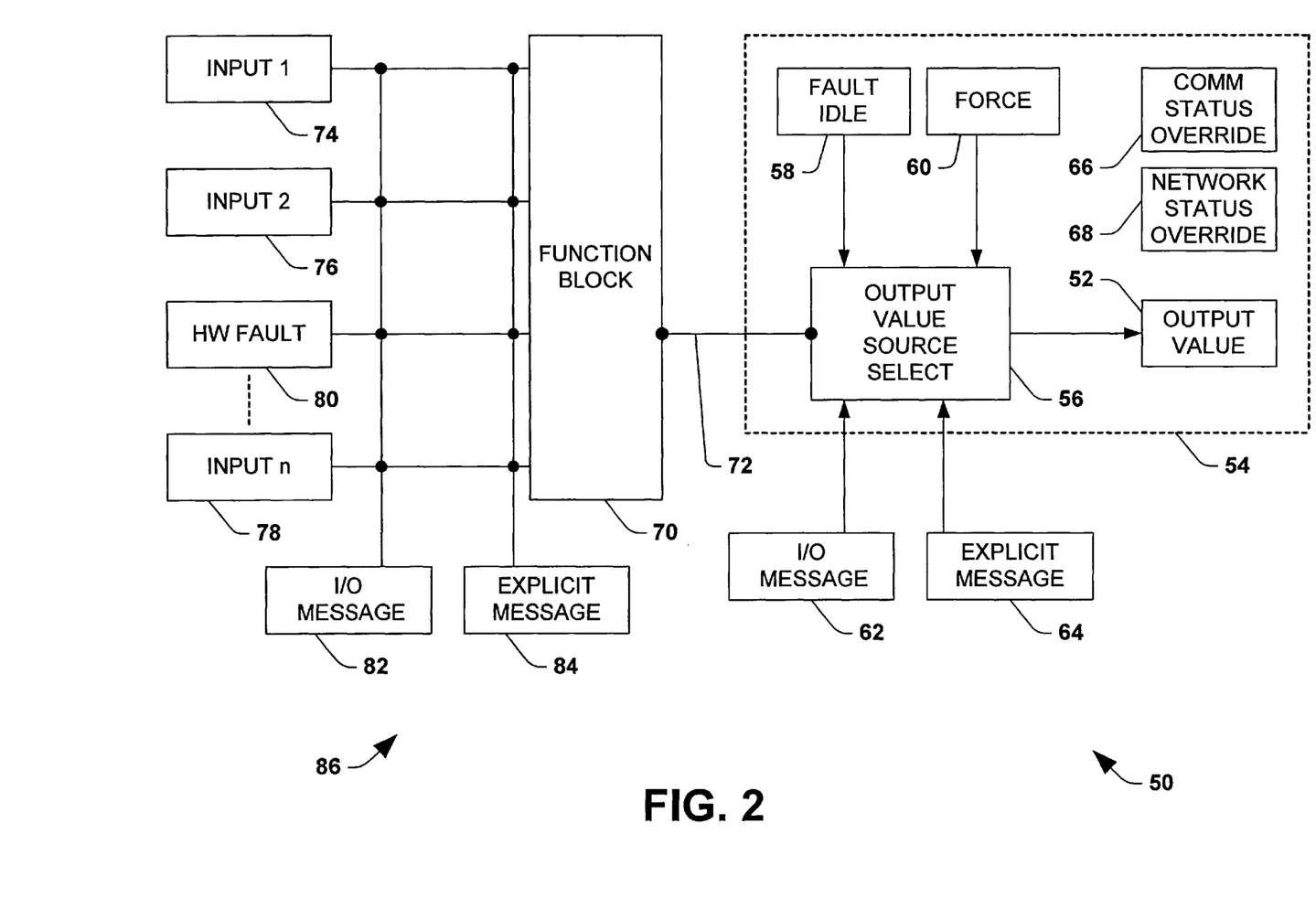
FIG. 2 is a schematic diagram illustrating a system for selecting an output value for an output device or module.

Referring now to FIG. 2, a system 50 for selecting an output value 52 for an output device or module 54 is illustrated, wherein the output device 54 comprises an output value source selector 56 for determining the output value 52. The output value source selector 56 receives external signals from a network or other communications medium (not shown), including a fault/idle message 58, a force message 60, an I/O message 62, and/or an explicit message 64. The device 54 may further comprise communication status and network status override attributes 66 and 68, respectively. The output value source selector 56 may be bound to a function block 70 via a binding 72. Although the exemplary system 50 is illustrated with the output value source selector bound to function block 70, other bindings are possible, such as a binding from the output value source selector 56 to input 2 76. The binding 72 creates an association between the output value source selector 56 and a logic function 86, such as the function block 70, which may include one or more hardware inputs 74, 76, and 78, a hardware fault input 80, I/O messages 82, and/or explicit messages 84. In this regard, outputs may be bound to function blocks, hardware inputs, faults, other outputs, or anything else a developer thinks may be useful in local logic 86.

Once the binding 72 has been made between the local logic 86 and the output value source selector 56 of the output device 54, I/O messages 62 and explicit message 64 will be ignored. Fault and idle conditions 58 may be selectively used or ignored based on the user-defined settings of one or more override attributes including, for example, communication status override attribute 66. The logic function performed by the function block 70 will generally provide a value for the output 52, unless the local logic 86 is disabled. In this case the device 54 enters an idle state, during which time an idle action and idle values (not shown) will be applied, for example, to go to a known value (e.g., the idle value), or to hold the last value.

Figure 3:
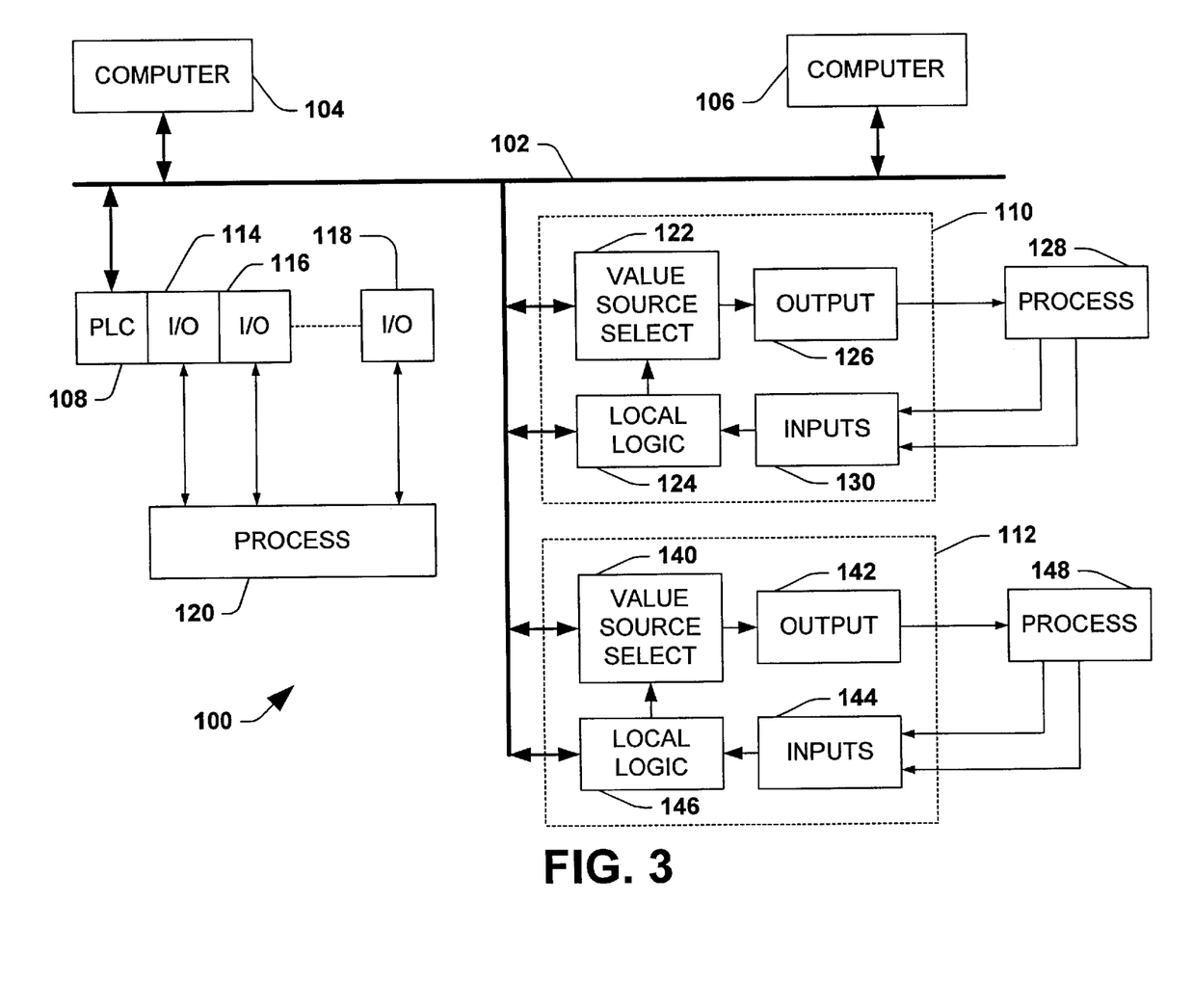
FIG. 3 is a schematic diagram illustrating a control system including the method and system for selecting an output value for an output device or module.

Referring now to FIG. 3, a control system 100 is illustrated, which includes the method and system for selecting an output value for an output device or module according to the present invention. A communications network 102 is connected between several elements of the system 100, including one or more computers 104 and 106, a programmable logic controller (PLC) 108, and exemplary output modules 110 and 112. Modules 110 and 112 are illustrated as having direct access to the network 102. However, it will be appreciated that the modules 110 and/or 112 may alternatively be connected to a PLC or other processor via a backplane (not shown) with a communications bus (not shown) thereon, with the PLC receiving messages for the module from the network 102. As an example, the PLC 108 may be connected to one or more I/O modules 114, 116, and 118, respectively, which in turn provide outputs to, and/or receive inputs from a process 120.

The exemplary output module 110 comprises a value source selector 122 which may receive messages and/or signals from the network 102 as well as a local logic function 124. An output 126 receives its value from the value source selector 122, and provides an output to a process 128. An inputs unit 130 may measure one or more process variables from the process 128, which may be provided thereby to the local logic function 124. The local logic function 124 may also be adapted to receive and send messages via the network 102. The module 110 may further comprise a processor and a stored control program (not shown) for implementing one or more control strategies to control the process 128. Similarly, the module 112 includes a value source selector 140, an output 142, an input 144, and a local logic function 146 to provide control of a process 148.

According to the invention, the value source selector 122 is adapted to selectively ignore I/O and explicit messages from the network 102 based on the association with the local logic function 124 (e.g., binding), selectively use an idle action (not shown) and set the output value 126 according to an idle value (not shown) when the local logic function 124 is disabled, selectively use a fault action (not shown) and set the output value 126 according to a fault value (not shown) based on an override attribute (not shown), and selectively ignore idle messages from the network 102 according to the override attribute. The module 110 of FIG. 3 thus allows a user many options in selecting an output value source for the output 126. This provides significant advantages over conventional networked I/O where the output value is controlled by information received from an I/O or explicit messaging service, or in the case of a fault or idle condition, from fault state and idle state attributes, respectively.

Figure 4:
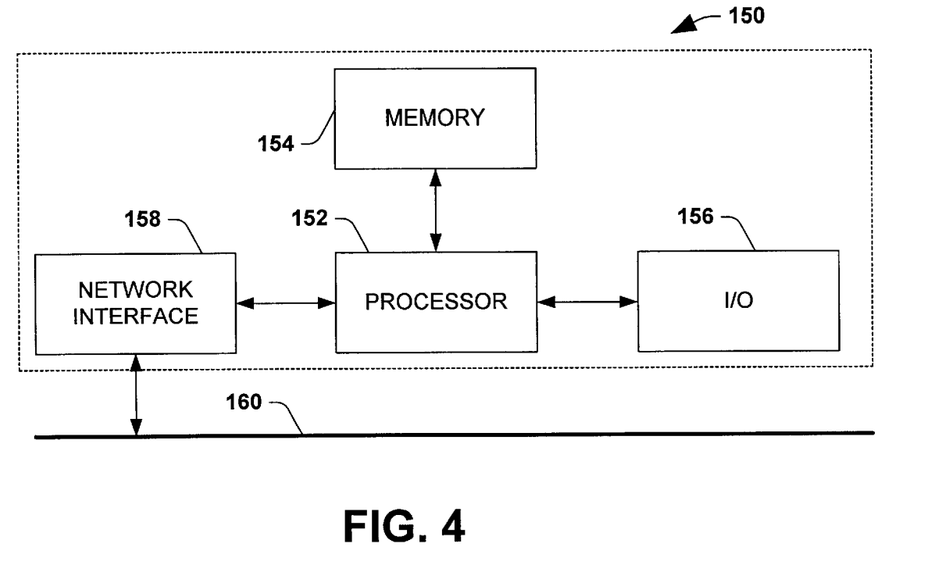
FIG. 4 is a schematic diagram illustrating an output device or module in which the methods and systems of the present invention may be implemented.
Figure 5:
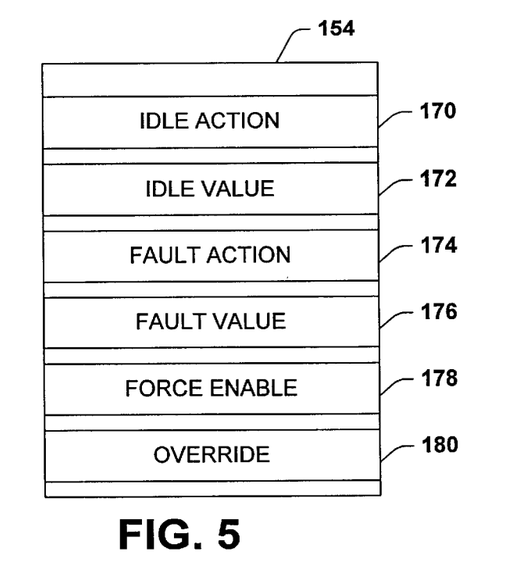
FIG. 5 is a schematic diagram illustrating user-defined attributes in accordance with the invention.

Referring now to FIG. 4, an output device or module 150 is illustrated in which the methods and systems of the present invention may be implemented. The module 150 comprises a processor 152 connected with a memory 154, and I/O section 156, and a network communications interface 158. The interface 158 provides communications between the processor 152 and a communications network 160. In accordance with the invention, an output of the I/O section 156 is associated with (e.g., bound to) a logic function, which may comprise a function block, a hardware input, a fault, and/or an output. The logic function may be implemented in the processor 152 according to a program and/or user-defined attributes stored in the memory 154. Referring also to FIG. 5, the memory 154 may contain one or more user-defined attributes associated with an output value source selector feature of the module 150. The attributes may include an idle action 170, an idle value 172, a fault action 174, a fault value 176, and force enable attribute 178, and one or more override attributes 180. The processor 152 may perform output value source selection according to the invention. These attributes and the various values (e.g., idle value, fault value, etc.) associated with an output device may be user-defined, for example, via a computer or other tool sending messages across the network 160, or even via dipswitches on the output device.

Referring also to FIG. 1, the module 150 may comprise instructions (not shown) in the memory 154 for implementing the output value source selection method 2, by which an output value may be determined by the processor 152 for an output of the I/O section 156. In this regard, the association (e.g., binding) of an output to a logic function allows a user to define where the output will get its output value from, based on the configuration of the module 150, the state of the module 150, and the state of the network 160, as discussed supra with respect to FIGS. 1 and 2. In this regard, the processor or output value source selector 152 may be adapted to selectively ignore I/O and explicit messages from the network 160 based on the association between the output and local logic, selectively use an idle action and set the output value according to an idle value when the local logic function is disabled, selectively use a fault action and set the output value according to a fault value based on an override attribute, and selectively ignore idle messages from the network 160 according to the override attribute.

Although the invention has been shown and described with respect to a certain embodiments, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a system as well as a computer-readable medium having computer-executable instructions for performing the steps of the various methods of the invention.

In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A method of selecting an output value for an output device in communication with a network, comprising:
    associating the output device with a logic function;
    providing the output value according to the logic function;
    ignoring explicit messages from the network;
    ignoring value messages from the network;
    selectively ignoring fault messages according to an override attribute; and
    selectively ignoring idle messages according to the override attribute.

2. The method of claim 1, wherein associating the output device with the logic function comprises creating a binding between the output device and at least one of a function block, a hardware input, a fault, and an output.

3. The method of claim 2, wherein providing the output value according to the logic function comprises setting the output value according to one of a function block, a hardware input, a fault, and an output according to the logic function.

4. The method of claim 3, wherein providing the output value according to the logic function further comprises selectively using an idle action and setting the output value according to an idle value when the local logic function is disabled.

5. The method of claim 4, wherein ignoring explicit messages from the network comprises sending an object state conflict error to the network in response to an explicit message from the network.

6. The method of claim 4, wherein selectively ignoring fault messages according to an override attribute comprises selectively using a fault action and setting the output value according to a fault value.

7. The method of claim 4, wherein selectively ignoring idle messages according to the override attribute comprises selectively using an idle action and setting the output value according to an idle value.

8. The method of claim 1, wherein providing the output value according to the logic function comprises selectively using an idle action and setting the output value according to an idle value when the local logic function is disabled.

9. The method of claim 1, wherein ignoring explicit messages from the network comprises sending an object state conflict error to the network in response to an explicit message from the network.

10. The method of claim 1, wherein selectively ignoring fault messages according to an override attribute comprises selectively using a fault action and setting the output value according to a fault value.

11. The method of claim 1, wherein selectively ignoring idle messages according to the override attribute comprises selectively using an idle action and setting the output value according to an idle value.

12. A system for selecting an output value for an output device in communication with a network, comprising:
  means for associating the output device with a logic function;
  means for providing the output value according to the logic function;
  means for ignoring explicit messages from the network;
  means for ignoring value messages from the network;
  means for selectively ignoring fault messages according to an override attribute; and
  means for selectively ignoring idle messages according to the override attribute.

13. The system of claim 12, wherein the means for associating the output device with the logic function comprises means for creating a binding between the output device and at least one of a function block, a hardware input, a fault, and an output.

14. The system of claim 12, wherein the means for providing the output value according to the logic function comprises means for selectively using an idle action and setting the output value according to an idle value when the local logic function is disabled.

15. The system of claim 12, wherein the means for ignoring explicit messages from the network comprises means for sending an object state conflict error to the network in response to an explicit message from the network.

16. The system of claim 12, wherein the means for selectively ignoring fault messages according to an override attribute comprises means for selectively using a fault action and setting the output value according to a fault value and the means for selectively ignoring idle messages according to the override attribute comprises means for selectively using an idle action and setting the output value according to an idle value.

17. An output module, comprising:
  a value source selector adapted to receive messages from a network;
  a local logic function associated with the value source selector to create a binding, and providing a signal thereto;
  an output receiving an output value from the value source selector based on the signal from the local logic function, and having an output signal;
  wherein the value source selector is adapted to selectively ignore I/O and explicit messages from the network based on the binding, selectively use an idle action and set the output value according to an idle value when the local logic function is disabled, selectively use a fault action and set the output value according to a fault value based on an override attribute, and selectively ignore idle messages according to the override attribute.

18. The output module of claim 17, further comprising a memory, wherein the value source selector is a processor, and the local logic function is a program in the memory.

* * * * *